(12) United States Patent
Yeh

(10) Patent No.: US 9,118,193 B2
(45) Date of Patent: Aug. 25, 2015

(54) BIDIRECTIONAL WIRELESS CHARGING/DISCHARGING DEVICE FOR PORTABLE ELECTRONIC DEVICE

(71) Applicant: Ming-Hsiang Yeh, Taipei (TW)

(72) Inventor: Ming-Hsiang Yeh, Taipei (TW)

( * ) Notice: Subject to any disclaimer, the term of this patent is extended or adjusted under 35 U.S.C. 154(b) by 349 days.

(21) Appl. No.: 13/648,422

(22) Filed: Oct. 10, 2012

(65) Prior Publication Data

US 2014/0097790 A1 Apr. 10, 2014

(51) Int. Cl.
| | |
|---|---|
| H02J 7/00 | (2006.01) |
| H02J 7/02 | (2006.01) |
| H02M 3/158 | (2006.01) |
| H01F 38/14 | (2006.01) |

(52) U.S. Cl.
CPC .............. *H02J 7/0029* (2013.01); *H02J 7/0063* (2013.01); *H02J 7/025* (2013.01); *H02M 3/1582* (2013.01); *H01F 38/14* (2013.01); *H02J 2007/0059* (2013.01)

(58) Field of Classification Search
CPC ........ H02J 7/025; H01F 38/14; Y02T 90/122; Y02T 90/128
USPC ............................ 320/108, 112, 118; 307/104
See application file for complete search history.

(56) References Cited

U.S. PATENT DOCUMENTS

| | | | | |
|---|---|---|---|---|
| 7,825,625 B2 * | 11/2010 | Posamentier | ................. | 320/108 |
| 7,944,171 B2 * | 5/2011 | Yeh | ................. | 320/108 |
| 8,432,130 B2 * | 4/2013 | Yin et al. | ................. | 320/108 |
| 8,698,450 B2 * | 4/2014 | Yeh | ................. | 320/108 |
| 8,729,853 B2 * | 5/2014 | Yeh | ................. | 320/108 |
| 8,803,476 B2 * | 8/2014 | Vorenkamp et al. | .......... | 320/108 |
| 8,816,638 B2 * | 8/2014 | Vorenkamp et al. | .......... | 320/109 |
| 8,878,487 B2 * | 11/2014 | Wu et al. | ................. | 320/108 |
| 2006/0220610 A1 * | 10/2006 | Solberg | ................. | 320/105 |
| 2009/0184679 A1 * | 7/2009 | Yeh | ................. | 320/108 |
| 2010/0277121 A1 * | 11/2010 | Hall et al. | ................. | 320/108 |
| 2011/0156636 A1 * | 6/2011 | Kim | ................. | 320/108 |
| 2011/0241614 A1 * | 10/2011 | Yeh | ................. | 320/108 |
| 2011/0241615 A1 * | 10/2011 | Yeh | ................. | 320/108 |
| 2011/0291614 A1 * | 12/2011 | Yeh | ................. | 320/108 |
| 2011/0298418 A1 * | 12/2011 | Yeh | ................. | 320/108 |
| 2012/0001589 A1 * | 1/2012 | Yeh | ................. | 320/108 |
| 2012/0001590 A1 * | 1/2012 | Yeh | ................. | 320/108 |
| 2012/0013294 A1 * | 1/2012 | Yeh | ................. | 320/108 |
| 2012/0013295 A1 * | 1/2012 | Yeh | ................. | 320/108 |
| 2012/0091950 A1 * | 4/2012 | Campanella et al. | ......... | 320/108 |
| 2012/0112691 A1 * | 5/2012 | Kurs et al. | ................. | 320/108 |
| 2012/0235633 A1 * | 9/2012 | Kesler et al. | ................. | 320/108 |
| 2012/0235634 A1 * | 9/2012 | Hall et al. | ................. | 320/108 |

(Continued)

*Primary Examiner* — Helen Rossoshek
(74) *Attorney, Agent, or Firm* — Bacon & Thomas, PLLC

(57) ABSTRACT

A bidirectional wireless charging/discharging device for the portable electronic device includes a logic control unit, a boost/buck unit, first and second reverse current suppressors, a control switch, and a receipt/transmission mode selection unit. The logic control unit includes an automatic mode selection resetting module. The reverse current suppressor provide function of reverse current prevention and switching. The boost/buck unit controls stepping up/down of voltage in a charging operation. The logic control unit detects if a load exists and controls the operations of the boost/buck unit and the reverse current suppressor and is used in combination with the control switch to control the performance of charging or discharging and is further used in combination with the receipt or transmission mode selection unit to select a desired mode of operation. The receipt/transmission mode selection unit is electrically connected to automatic mode selection resetting module.

15 Claims, 3 Drawing Sheets

(56) References Cited

U.S. PATENT DOCUMENTS

| | | | |
|---|---|---|---|
| 2012/0306440 A1* | 12/2012 | Yeh | 320/108 |
| 2013/0119773 A1* | 5/2013 | Davis | 307/104 |
| 2013/0162201 A1* | 6/2013 | Yeh | 320/108 |
| 2013/0175981 A1* | 7/2013 | Yeh | 320/108 |
| 2013/0249479 A1* | 9/2013 | Partovi | 320/108 |
| 2013/0249481 A1* | 9/2013 | Jacobs et al. | 320/108 |
| 2013/0271069 A1* | 10/2013 | Partovi | 320/108 |
| 2013/0285604 A1* | 10/2013 | Partovi | 320/108 |
| 2013/0285605 A1* | 10/2013 | Partovi | 320/108 |
| 2014/0015470 A1* | 1/2014 | Lim et al. | 320/101 |
| 2014/0152248 A1* | 6/2014 | Yeh | 320/108 |
| 2014/0152249 A1* | 6/2014 | Yeh | 320/108 |
| 2014/0159662 A1* | 6/2014 | Furui et al. | 320/112 |
| 2014/0176076 A1* | 6/2014 | Momo et al. | 320/128 |
| 2014/0239889 A1* | 8/2014 | Endo | 320/108 |
| 2014/0306654 A1* | 10/2014 | Partovi | 320/108 |
| 2015/0022149 A1* | 1/2015 | Bae | 320/108 |

* cited by examiner

BIDIRECTIONAL WIRELESS CHARGING/DISCHARGING DEVICE FOR PORTABLE ELECTRONIC DEVICE

FIELD OF THE INVENTION

The present invention relates to a bidirectional wireless charging/discharging device for portable electronic device, and in particular to a bidirectional wireless charging/discharging device for portable electronic device that avoids accumulated damage caused by each charging made to a cell and improves wireless charging/discharging efficiency and boost/buck efficiency.

BACKGROUND OF THE INVENTION

The prevailing of wireless charging brings a future scenario of wireless charging everywhere.

Wireless charging everywhere provides excellent convenience. However, the surges occurring at the initial moment of each time charging is made either wirelessly or with a cable will cause accumulated damage to an electrical cell. Such accumulated damage shortens the lifespan of the electrical cell. In other words, the more the times that charging is made, the shorter the lifespan of an electrical cell will be and the worse the efficiency of charging and discharging the electrical cell.

In such a scenario of wireless charging everywhere, there must be a great number of wireless charging sites within the range of activity of a person or the person may frequently enter and leave a wireless charging site. Under these situations, a portable electronic device carried by the person will be subjected to wireless charging several times indiscriminately in a single day. This causes a great shortening of the lifespan of an electrical cell contained in the portable electronic device.

Further, since the efficiency of charging/discharging made wirelessly is still low at present. That means the amount of electricity discharged is higher than the amount of electricity charged. This, plus the low efficiency of boost/buck, makes it not possible to improve the utilization of wireless charging/discharging. It has long been desired to improve this issue.

Further, a portable electronic device is often provided with the function of charging, but is not allowed to transfer the electrical power thereof to charge other electronic devices. This is a drawback. In addition, even the portable electronic device is provided with both functions of charging and discharging, it is often not available for the portable electronic device to switch between charging and discharging as desired. It causes troubles in operation.

Thus, a challenge of the present invention is to provide a device that avoids the accumulated damage caused by each time charging is made to an electrical cell and may even improve charging/discharging efficiency and boost/buck efficiency.

SUMMARY OF THE INVENTION

An object of the present invention is to provide a bidirectional wireless charging/discharging device, wherein the bidirectional wireless charging/discharging device features bidirectional charging/discharging so that a portable electronic device equipped with the bidirectional wireless charging/discharging device of the present invention can do wireless charging and also wireless discharging and is provided with the functions of selecting between charging and discharging modes and automatic return to the selected mode, making the operation easy and convenient.

Another object of the present invention is to provide a bidirectional wireless charging/discharging device, wherein the unique locations where supercapacitors are arranged and the characteristics that the impedance of the supercapacitors is lower than that of an electrical cell makes the supercapacitors be first charged when performing a charging operation so as to use the supercapacitors to resist surges occurring in each charging operation and therefore eliminate the accumulated damage caused by each operation of charging the electrical cell and first and second reverse current suppressors are included provide a function to prevent a reverse current and thus provide an effect of power saving.

A further object of the present invention is to provide a bidirectional wireless charging/discharging device, wherein a boost/buck unit used is a boost/buck unit that comprises synchronous rectification (preferably MOSFET based synchronous rectification) so as to improve boost/buck efficiency.

A further object of the present invention is to provide a bidirectional wireless charging/discharging device, wherein first to third reverse current suppressors are included, which also comprise first and second MOSFETs for reverse current prevention or serving as major components for switching so that the power loss in conduction is reduced, thereby improving discharging efficiency and thus improving efficiency of wireless charging and discharging.

A further object of the present invention is to provide a bidirectional wireless charging/discharging device, wherein a main switch is additionally included, which function as a master switch of an electricity system, meaning convenience and utilization of activating or deactivating the bidirectional wireless charging/discharging function can be realized through controlling a signal switch.

Yet a further object of the present invention is to provide a bidirectional wireless charging/discharging device, wherein protection circuits are provided for detecting temperature and voltage of electrical cell in order to effect protection in the transmission or receiving process, whereby over heating and over charging or over discharging of the electrical cell can be prevented.

To achieve the above objects, the present invention provides a bidirectional wireless charging/discharging device, which is used in a portable electronic device comprising a circuit device, wherein the circuit device is electrically connected to a power receiving terminal and an electrical cell. The bidirectional wireless charging/discharging device comprises a logic control unit, a wireless receiving/transmitting unit, a boost/buck unit, a first reverse current suppressor, a second reverse current suppressor, a control switch, and a receipt or transmission mode selection unit. The logic control unit comprises an automatic mode selection resetting module and a plurality of pins. The wireless receiving/transmitting unit comprises a transmission terminal and a receipt terminal and the receipt terminal is electrically connected to a detection pin of the logic control unit. The boost/buck unit comprises a first voltage regulation terminal, a second voltage regulation terminal, and two control terminals. The second voltage regulation terminal is electrically connected to the transmission terminal of the wireless receiving/transmitting unit. The two control terminals are respectively and electrically connected to first and second control pins of the logic control unit. The logic control unit has a power pin electrically connected to the second voltage regulation terminal and the transmission terminal that are connected to each other. The first reverse current suppressor comprises an input terminal, an output terminal, and a control terminal. The input terminal and the output terminal are respectively and electrically connected to a discharging terminal of the electrical cell and the first voltage regulation terminal of the boost/buck unit. The control terminal is electrically connected to a third control pin of the logic control unit. The control switch has an end electrically connected to the discharging terminal of the electrical cell and an opposite end electrically connected to the control terminal of the first reverse current suppressor and the third control pin of the logic control unit. The second reverse current suppressor comprises an input terminal, an output terminal, and a control terminal. The output terminal and the input terminal are respectively and electrically connected to the power receiving terminal of the circuit device and the first voltage regulation terminal of the boost/buck unit. The control terminal is electrically connected to a fifth control pin of the logic control unit. The receipt or transmission mode selection unit is electrically connected between a receipt or transmission mode detection pin of the logic control unit and the discharging terminal of the electrical cell. The receipt or transmission mode detection pin is electrically connected to the automatic mode selection resetting module.

As such, the supercapacitors are used to resist surges occurring in each charging operation, thus eliminating the accumulated damage caused by each operation of charging the electrical cell. First and second reverse current suppressors are provided to prevent a reverse current and thus provide an effect of power saving. The additionally included receipt or transmission mode selection switch allows a user to switch to a selected mode of operation.

Further, the present invention also provides a bidirectional wireless charging/discharging device, which comprises a boost/buck unit that is a boost/buck unit comprising synchronous rectification (preferably, MOSFET based synchronous rectification) so as to improve boost/buck efficiency.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
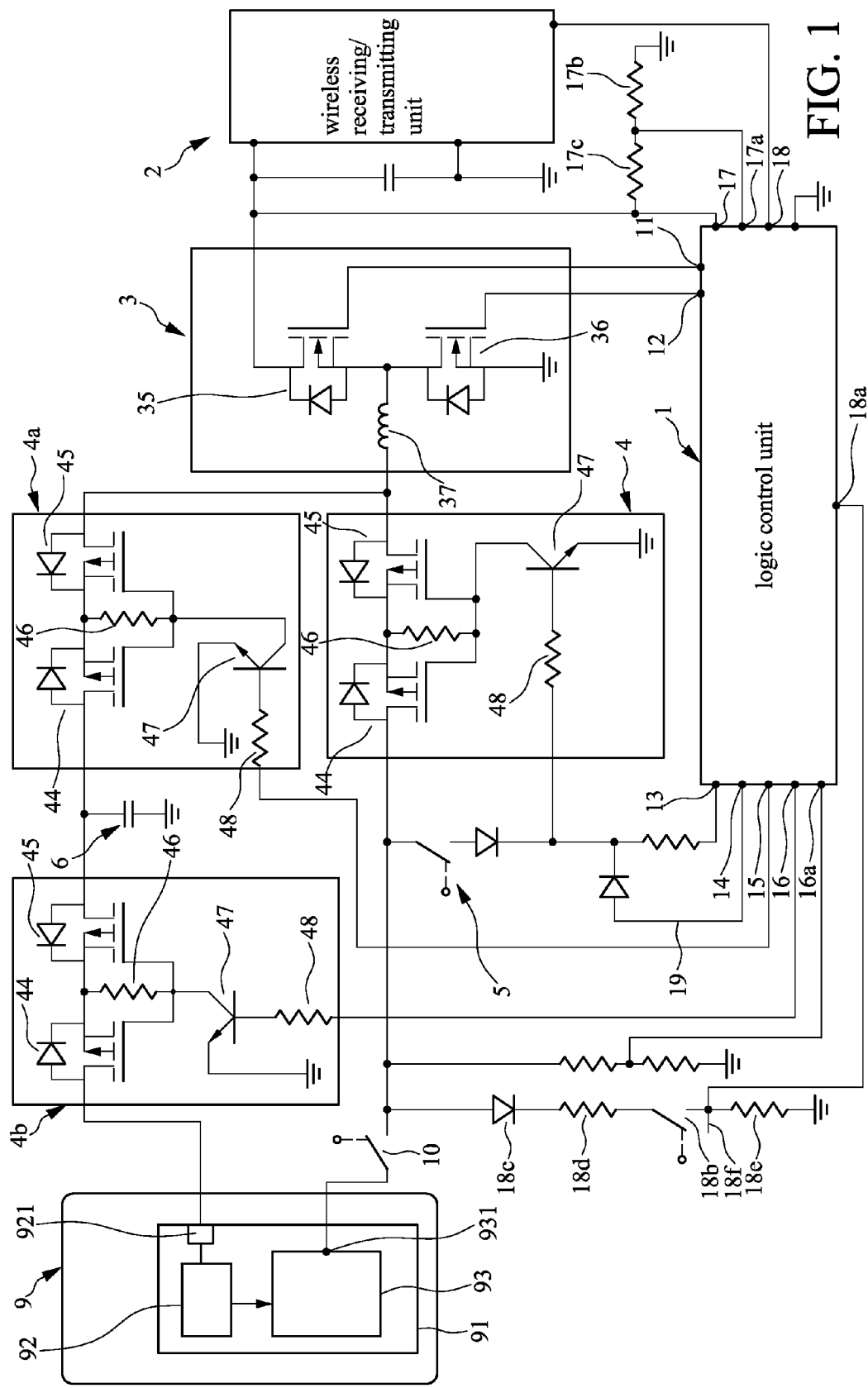
FIG. 1 is a circuit diagram of a bidirectional wireless charging/discharging device according to a first embodiment of the present invention electrically connected to a portable electronic device.
Figure 2:
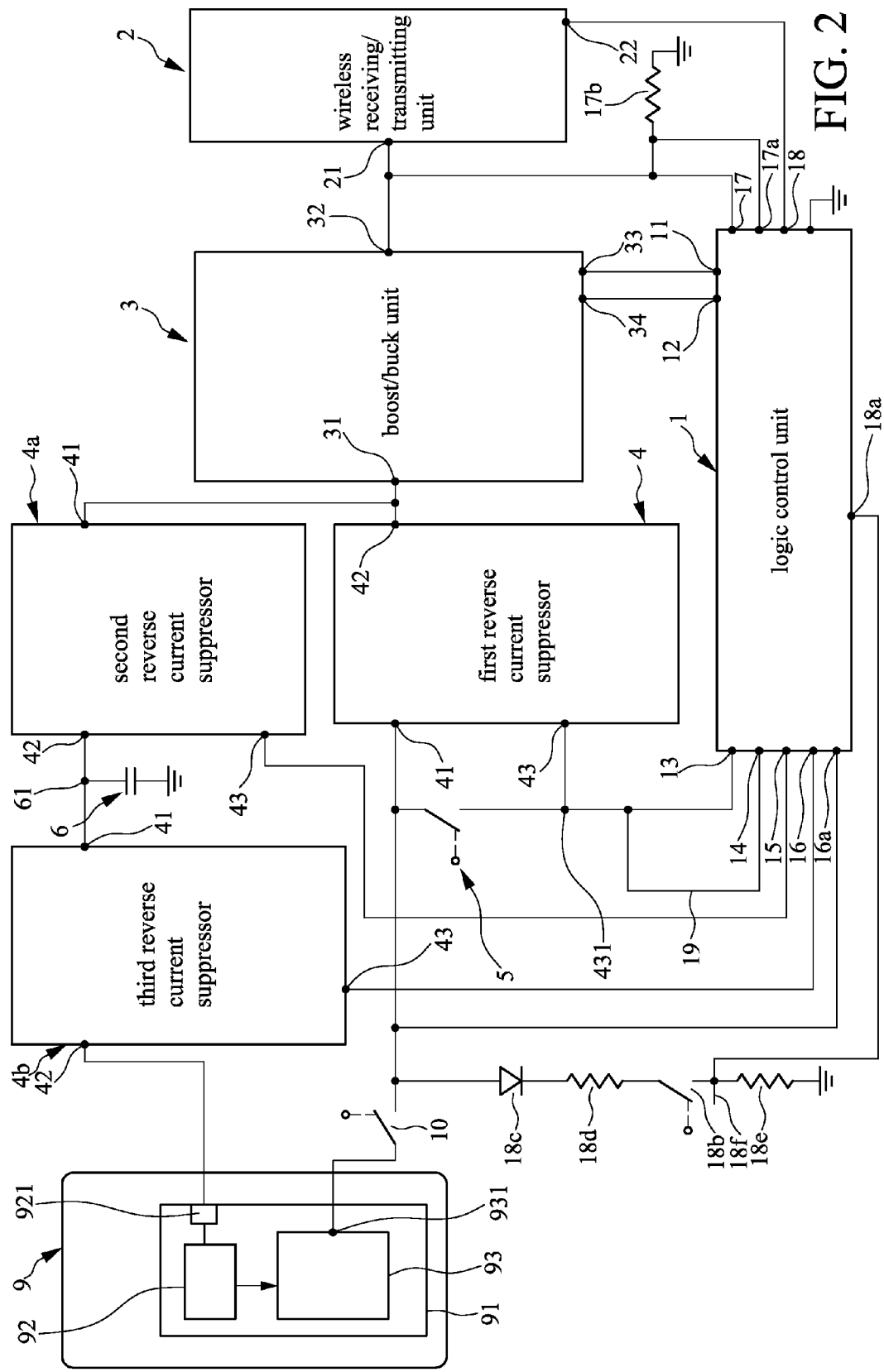
FIG. 2 is an equivalent circuit block diagram of FIG. 1.
Figure 3:
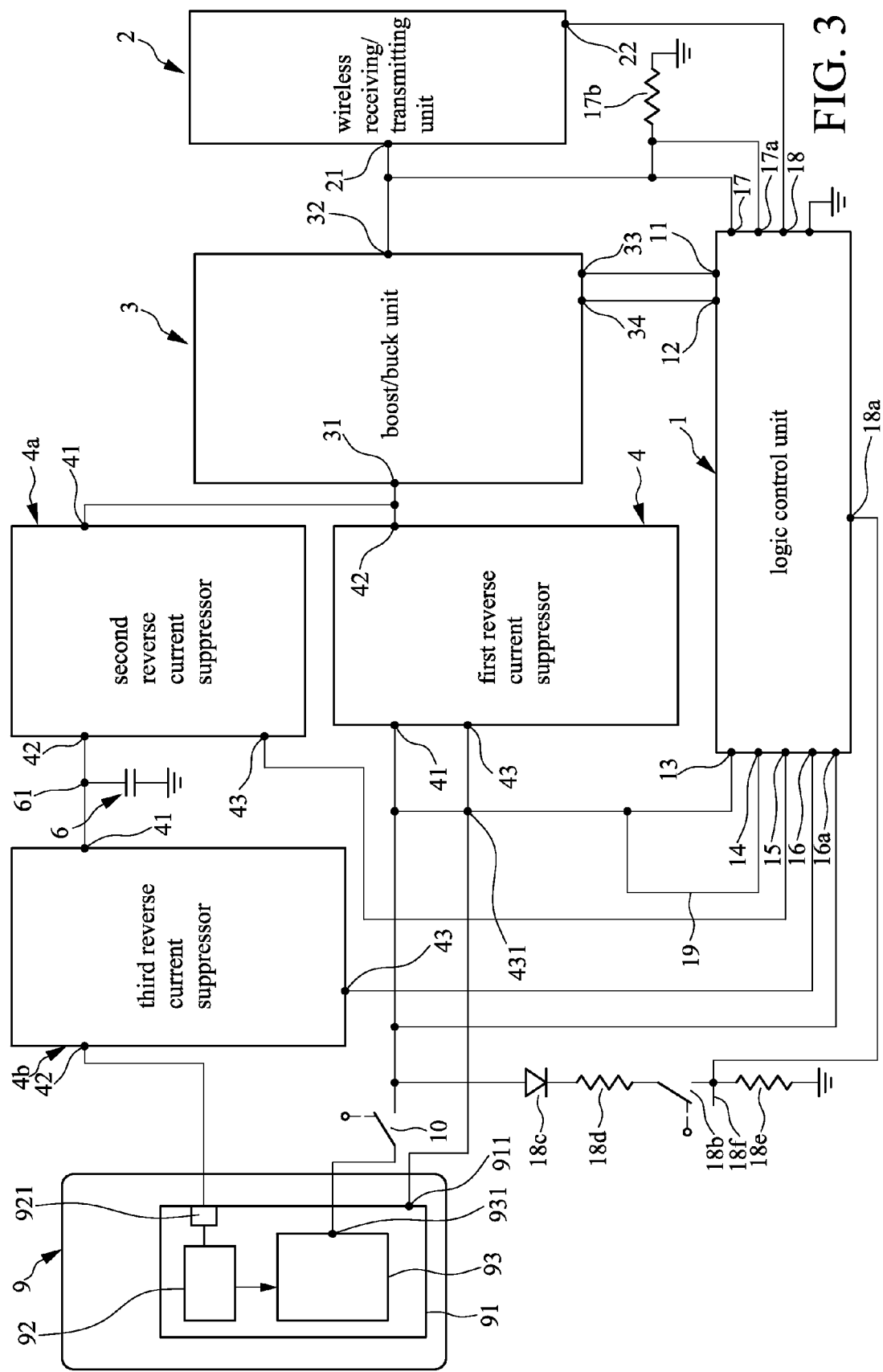
FIG. 3 is an equivalent circuit block diagram of a second embodiment of the present invention.

The present invention provides a bidirectional wireless charging/discharging device for portable electronic device. FIGS. 1 and 2 show a first embodiment of the present invention and FIG. 3 shows a second embodiment of the present invention.

First Embodiment

Referring to FIG. 2, the first embodiment of the present invention is applicable to a portable electronic device 9 that comprises a circuit device 91. The circuit device 91 is electrically connected to a power receiving terminal 921 and an electrical cell 93, and preferably, the circuit device 91 comprises a protection circuit 92 that is electrically connected to between the power receiving terminal 921 and the electrical cell 93. The bidirectional wireless charging/discharging device comprises: a logic control unit 1, a wireless receiving/ transmitting unit 2, a boost/buck unit 3, a first reverse current suppressor 4, a second reverse current suppressor 4a, and a control switch 5 and preferably further comprises a third reverse current suppressor 4b, a first supercapacitor 6, and a second supercapacitor (not shown).

The logic control unit 1 comprises first to sixth control pins 11-16 and a power pin 17 and a detection pin 18, and an additional pin that is not labeled is a grounding pin.

The wireless receiving/transmitting unit 2 comprises a transmission terminal 21 and a receipt terminal 22. The receipt terminal 22 is electrically connected to the detection pin 18 of the logic control unit 1.

The boost/buck unit 3 comprises a first voltage regulation terminal 31, a second voltage regulation terminal 32, and two control terminals 33, 34. The second voltage regulation terminal 32 is electrically connected to the transmission terminal 21 of the wireless receiving/transmitting unit 2. The two control terminals 33, 34 are respectively and electrically connected to the first and second control pins 11, 12 of the logic control unit 1. The power pin 17 of the logic control unit 1 is electrically connected to the second voltage regulation terminal 32 and the transmission terminal 21 that are connected to each other. Preferably, the boost/buck unit 3 is a boost/buck unit 3 that comprise synchronous rectification and is of MOSFET (Metal-Oxide-Semiconductor Field-Effect Transistor) based synchronous rectification. Referring to FIGS. 1 and 2, the boost/buck unit 3 with synchronous rectification comprises an inductor 37 and first and second MOSFETs 35, 36 that are serially connected in the same direction. The first and second MOSFETs 35, 36 are each provided with a control terminal (not labeled) and the two control terminals are respectively and electrically connected to the two control terminals 33, 34 of the boost/buck unit 3. The first and second MOSFETs 35, 36, after being serially connected, have a terminal electrically connected to the second voltage regulation terminal 32 and an opposite terminal grounded. The inductor 37 has an end electrically connected to the first voltage regulation terminal 31 and an opposite end electrically connected between the first and second MOSFETs 35, 36.

The first reverse current suppressor 4 comprises an input terminal 41, an output terminal 42, and a control terminal 43. The input terminal 41 and the output terminal 42 are respectively and electrically connected to a discharging terminal 931 of the electrical cell 93 and the first voltage regulation terminal 31 of the boost/buck unit 3. The control terminal 43 is electrically connected to the third control pin 13 (for transmission identification) of the logic control unit 1. Preferably, the fourth control pin 14 of the logic control unit 1 is further electrically connected to the third control pin 13 in a form of loop, namely a transmission sustaining circuit 19 (for the purposes of sustaining a transmission mode) shown in the drawings.

The control switch 5 has an end electrically connected to the discharging terminal 931 of the electrical cell 93 and an opposite end electrically connected to the control terminal 43 of the first reverse current suppressor 4 and the third control pin 13 of the logic control unit 1. The control switch 5 controls switching to a receipt mode or the transmission mode. The connection of the control switch 5 to the control terminal 43 of the first reverse current suppressor 4 forms a second node 431. Preferably, the control switch 5 is an automatic return switch.

The second reverse current suppressor 4a also comprises an input terminal 41, an output terminal 42, and a control terminal 43. The output terminal 42 and the input terminal 41 are respectively and electrically connected to the power receiving terminal 921 of the protection circuit 92 of the circuit device 91 and the first voltage regulation terminal 31 of the boost/buck unit 3. The control terminal 43 is electrically connected to the fifth control pin 15 of the logic control unit 1.

The first supercapacitor 6 has a terminal electrically connected to the connection between the power receiving terminal 921 of the protection circuit 92 of the circuit device 91 and the output terminal 42 of the second reverse current suppressor 4a and the connection forms a first node 61. The first supercapacitor 6 has an opposite end grounded.

The third reverse current suppressor 4b also comprises an input terminal 41, an output terminal 42, and a control terminal 43. The output terminal 42 and the input terminal 41 are respectively and electrically connected to the power receiving terminal 921 of the protection circuit 92 of the circuit device 91 and the first node 61. The control terminal 43 is electrically connected to the sixth control pin 16 of the logic control unit 1, wherein the sixth control pin 16 of the logic control unit 1 supplies a control signal to control ON/OFF state of the third reverse current suppressor 4b and thus control whether to charge the electrical cell 93 or not. Further, the second supercapacitor that is not shown in the drawings is connected in parallel to the electrical cell 93. It is apparent that the bidirectional wireless charging/discharging device of the present invention can comprise various arrangements of the supercapacitor(s), such as comprising only the first supercapacitor 6, comprising only the second supercapacitor (not shown), or comprising both the first supercapacitor 6 and the second supercapacitor.

Since the impedance of the first supercapacitor 6 and the second supercapacitor is lower than the electrical cell 93, charging will be made to the supercapacitors first, so that the supercapacitors function to overcome or alleviate the surges occurring in each charging operation. Further, the supercapacitors are easy to be charged to saturation and thus charging can be quickly redirected to the electrical cell 93.

Referring to FIGS. 1 and 2, each of the reverse current suppressors (4, 4a, 4b) comprises a first resistor 46 and first and second MOSFETs 44, 45 that are serially connected in opposite directions. The two serially-connected MOSFETs has two terminals that are respectively the input terminal 41 and the output terminal 42 of the reverse current suppressor. The first and second MOSFETs 44, 45 each comprise a control terminal (not labeled) and the two control terminals are electrically connected to the control terminal 43 of the reverse current suppressor. The first resistor 46 has an end electrically connected between the first and second MOSFETs 44, 45 and an opposite end electrically connected to the control terminal 43 of the reverse current suppressor. Further, each of the reverse current suppressors (4, 4a, 4b) further comprises a transistor 47 and a second resistor 48. The transistor 47 has a first terminal electrically connected to the control terminals (not labeled) of the first and second MOSFETs 44, 45 and the transistor 47 has a second terminal that is grounded. The second resistor 48 is electrically connected between a third terminal of the transistor 47 and the control terminal 43 of the reverse current suppressor.

Description will now be given to the transmission mode of the bidirectional wireless charging/discharging device according to the first embodiment of the present invention.

Since the bidirectional wireless charging/discharging device is pre-set in the receipt mode, to enter the transmission mode, the control switch 5 is activated to effect switching.

Considering the situation that a portable electronic device 9 that comprises the bidirectional wireless charging/discharging device according to the present invention attempts to transfer electrical power thereof through wireless transmission to another electronic device that comprises a wireless charging device, the control switch 5 is first pressed down for conduction and the electricity of the electrical cell 93 is allowed to flow through the control switch 5, then through the third control pin (transmission identification control pin) 13 so as to allow the logic control unit 1 to identify that switching is now made to the transmission mode. When the control switch 5 is conducted on to conduct the first reverse current suppressor 4, the electricity of the electrical cell 93 that was originally blocked by the first reverse current suppressor 4 is now allowed to pass and then flowing through the first MOSFET 35 of the boost/buck unit 3 to reach the power pin 17 of the logic control unit 1 to power the logic control unit 1. The second reverse current suppressor 4a helps blocking reverse flow of the electricity back to the electrical cell 93.

When the logic control unit 1 identifies the current operation mode is transmission mode, the transmission sustaining circuit 19 (for the purposes of sustaining a transmission mode) helps to continuously supply the transmission signal of the fourth control pin 14 to the third control pin 13 so as to achieve sustained transmission and maintain the transmitting state.

The detection pin 18 of the logic control unit 1 detects if an electronic device to be charged exists opposite to the wireless receiving/transmitting unit 2 that contains an antenna. If no logic control unit 1 is detected, then the transmission is shut down. The detection is made with the detection pin 18 to identify if a load exists opposite to the wireless receiving/transmitting unit 2.

If no such a load exists, then transmission is stopped.

If there is indeed a load existing, the logic control unit 1 uses the first and second control pins 11, 12 to supply PWM (Pulse Width Modulation) signals to drive the first and second MOSFETs 35, 36 of the boost/buck unit 3. With such PWM signals, the first and second MOSFETs 35, 36 are successively ad alternatively switched between ON/OFF states with an extremely high frequency. When the second MOSFET 36 is on and the first MOSFET 35 is off, since both the second MOSFET 36 and the electrical cell 93 have an end grounded to form a circuit, electricity from the electrical cell 93 passes through the first reverse current suppressor 4 and the inductor 37 of the boost/buck unit 3 to then flow through the second MOSFET 36 to charge the inductor 3. When the first MOSFET 35 is on and the second MOSFET 36 is off, electricity from the electrical cell 93, after passing through the inductor 37, flows through the first MOSFET 35 to allow the charged inductor 37 to discharge through the wireless receiving/transmitting unit 2.

In other words, the first and second MOSFETs 35, 36 are respectively and alternately switched on and off and switched off and on so as to respectively charge the inductor 37 and discharge the inductor 37. When electricity flows through an internal coil of the wireless receiving/transmitting unit 2, the coil generates magnetic lines of force and the electronic device on the opposite side receives and converts the magnetic lines of force into electrical current.

In transmission, for a route from the electrical cell 93 to the wireless receiving/transmitting unit 2, which passes through the first and second MOSFETs 35, 36 of the boost/buck unit 3 to effect voltage stepping up (such as stepping up from 3.6-4.2V DC to approximate 5V AC). On the other hand, a route from the wireless receiving/transmitting unit 2 to the electrical cell 93 effects voltage stepping down.

When one of the first and second MOSFETs 35, 36 controls voltage stepping up or down, the other one controls synchronous rectification.

A description will be given to the receipt mode of the bidirectional wireless charging/discharging device according to the first embodiment of the present invention.

When a portable electronic device 9 comprising the bidirectional wireless charging/discharging device of the present invention is in a condition that the wireless receiving/transmitting unit 2 receives electricity transmitted from an opposite side device, and the electricity is fed through the power pin 17 to the logic control unit 1. Then, the received electricity is transmitted through the boost/buck unit 3 and stepped down.

The logic control unit 1 may also use the transmission sustaining circuit 19 to set the first reverse current suppressor 4 to OFF state and use a control signal from the fifth control pin 15 of the logic control unit 1 to set the second reverse current suppressor 4a to ON state, whereby the stepped-down electricity passes through the second reverse current suppressor 4a and the first supercapacitor 6 that absorbs the surges (preferably further passing through the third reverse current suppressor 4b) to be supplied to the electrical cell 93 of the portable electronic device 9. In such a process, the protection circuit 92 effects protection to limit the charging range of the electrical cell 93 within a predetermined range (such as 4-6V DC). When the electrical cell 93 is fully charged, the protection circuit 92 takes a control to stop the charging operation. On the other hand, the electronic device on the opposite side will stop discharging if it does not detect a load (or may stop discharging when it detects the power level thereof is getting lower than a predetermined threshold).

When the logic control unit 1 is switched to the transmission mode, the fourth control pin 14 continuously supplies a transmission sustaining signal to maintain the first reverse current suppressor 4 in ON state. When the logic control unit 1 is switched to the receipt mode, the fifth control pin 15 continuously supplies a receipt signal to maintain the second reverse current suppressor 4a in ON state.

Second Embodiment

Referring to FIG. 3, a bidirectional wireless charging/discharging device according to a second embodiment is similar to that of the first embodiment with a difference being that the second embodiment omits the control switch 5 of the first embodiment and uses a control signal supplied from the portable electronic device 9 in substitute of the control switch 5 of the first embodiment.

As shown, the circuit device 91 of the portable electronic device 9 comprises a signal output terminal 911, which is manually controllable (such as pressing down a physical button on the portable electronic device 9 or clicking a virtual button shown on a touch screen of the portable electronic device 9) to supply a control signal through the signal output terminal 911 of the circuit device 91.

In the bidirectional wireless charging/discharging device according to the second embodiment of the present invention, the second node 431 of the first reverse current suppressor 4 is electrically connected to the signal output terminal 911 to receive the control signal supplied from the signal output terminal 911 for switching the logic control unit 1 (via the third control pin 13) to the transmission mode.

Further, in the above discussed first and second embodiments, the bidirectional wireless charging/discharging device according to the present invention may further comprise a receipt or transmission mode selection unit (which comprises a receipt or transmission mode selection switch 18b and a receipt or transmission mode selection signal 18f) and preferably further comprises a main switch 10, an electrical cell voltage detection pin 16a, and a temperature sensor 17b.

The receipt or transmission mode selection unit (which comprises the receipt or transmission mode selection switch 18b and the receipt or transmission mode selection signal 18f) is electrically connected between a receipt or transmission mode detection pin 18a of the logic control unit 1 and the discharging terminal 931 of the electrical cell 93, whereby the receipt or transmission mode selection unit selectively controls the bidirectional wireless charging/discharging device of the present invention to be in the transmission mode or the receipt mode. The receipt or transmission mode selection signal 18f is an external signal. Further, the logic control unit 1 further comprises an automatic mode selection resetting module (not shown). The automatic mode selection resetting module is electrically connected to the receipt or transmission mode detection pin 18a to have the receipt or transmission mode selection unit and the automatic mode selection resetting module electrically connected to each other. Under the condition where the receipt mode is set, in case switching is somehow made to the transmission mode, it is possible to use the automatic mode selection resetting module to determine when to resume the originally set receipt mode. On the other hand, under the condition where the transmission mode is set, it is possible to use the automatic mode selection resetting module for automatic resumption. Further, the control switch 5 may be additionally used in combination with the receipt or transmission mode selection unit, whereby when a user selects a receipt mode or a transmission mode, an immediate activation can be effected through the control switch 5 for the receipt mode or the receipt mode.

Preferably, the receipt or transmission mode selection unit comprises a diode 18c and a third resistor 18d electrically connected in serious thereto at an upstream side. The receipt or transmission mode selection unit may also comprises a fourth resistor 18e electrically connected in serious thereto at a downstream side.

The main switch 10 is electrically connected between the receipt or transmission mode selection switch 18b and the discharging terminal 931 of the electrical cell 93, whereby the main switch 10 may function to activate or deactivate the bidirectional wireless charging/discharging device according to the present invention. In brief, when the main switch 10 is set ON, transmission and receipt can be normally performed (and the receipt or transmission mode selection switch 18b is used to select operation mode). On the other hand, when the main switch 10 is OFF, transmission and receipt are prohibited.

The logic control unit 1 may further comprise a electrical cell voltage detection pin 16a, the electrical cell voltage detection pin 16a that is electrically connected to the discharging terminal 931 of the electrical cell 93 to read the voltage of the electrical cell 93. As such, undesired discharging to other device can be prevented when the electrical power is insufficient or continuous detection of the voltage of the electrical cell can be so as to timely stop a discharging operation before the electrical power thereof is being lowered down to a bottom level. On the other hand, it is also possible to provide protection of the electrical cell 93 against over charging.

The logic control unit 1 may further comprises a temperature detection pin 17a, which is electrically connected to a temperature sensor 17b to detect the temperature of the bidirectional wireless charging/discharging device of the present invention. For example, the temperature sensor 17b may be arranged at a site of the bidirectional wireless charging/discharging device where heat is most easily generated so as to detect if the temperature gets excessively high in the transmission or receipt process to thereby prevent over heating.

Preferably, the temperature sensor 17b is a thermistor of which the resistivity varies with temperature change to facilitate detection of temperature. Further, the thermistor is connected in parallel to an end of a fifth resistor 17c, while an opposite end of the fifth resistor 17c is electrically connected between the power pin 17 of the logic control unit 1 and the second voltage regulation terminal 32 of the boost/buck unit 3.

In summary, the present invention provides a bidirectional wireless charging/discharging device for the portable electronic device, which has the following features. The bidirectional wireless charging/discharging device of the present invention features bidirectional charging/discharging so that a portable electronic device 9 equipped with the bidirectional wireless charging/discharging device of the present invention can do wireless charging and also wireless discharging and is provided with the functions of selecting between charging and discharging modes and automatic return to the selected mode, making the operation easy and convenient. The unique locations where the supercapacitors are arranged and the characteristics that the impedance of the supercapacitors is lower than that of the electrical cell makes the supercapacitors be first charged when performing a charging operation so as to use the supercapacitors to resist surges occurring in each charging operation and therefore eliminate the accumulated damage caused by each operation of charging the electrical cell. First and second reverse current suppressors 4, 4a provide a function to prevent a reverse current and thus provide an effect of power saving. The boost/buck unit 2 used is a boost/buck unit that comprises synchronous rectification, preferably MOSFET based synchronous rectification, so as to improve boost/buck efficiency. The first to third reverse current suppressors 4, 4a, 4b also comprise first and second MOSFETs 44, 45 for reverse current prevention or serving as major components for switching so that the power loss in conduction is reduced, thereby improving discharging efficiency and thus improving efficiency of wireless charging and discharging. The main switch 10 and the receipt or transmission mode selection switch 18b allow a user to selectively switch to the receipt mode or the transmission mode. The main switch 10 function as a master switch of an electricity system and this means convenience and utilization of activating or deactivating the bidirectional wireless charging/discharging function can be realized through controlling a signal switch, wherein when the main switch 10 is set ON, transmission and receipt can be normally performed (where the receipt or transmission mode selection switch 18b may be used for mode selection). When the main switch 10 is set OFF, transmission and receipt are prohibited. Protection circuits are provided for detecting temperature and voltage of electrical cell in order to effect protection in the transmission or receiving process, whereby the bidirectional wireless charging/discharging device of the present invention can be protected against over heating and over charging or over discharging of the electrical cell 93.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A bidirectional wireless charging/discharging device, which is adapted to be used in a portable electronic device comprising a circuit device, wherein the circuit device is electrically connected to a power receiving terminal and an electrical cell, the bidirectional wireless charging/discharging device comprising:

a logic control unit, which comprises an automatic mode selection resetting module and a plurality of pins;

a wireless receiving/transmitting unit, which comprises a transmission terminal and a receipt terminal, the receipt terminal being electrically connected to a detection pin of the logic control unit;

a boost/buck unit, which comprises a first voltage regulation terminal, a second voltage regulation terminal, and two control terminals, the second voltage regulation terminal being electrically connected to the transmission terminal of the wireless receiving/transmitting unit, the two control terminals being respectively and electrically connected to first and second control pins of the logic control unit, the logic control unit having a power pin electrically connected to the second voltage regulation terminal and the transmission terminal that are connected to each other;

a first reverse current suppressor, which comprises an input terminal, an output terminal, and a control terminal, the input terminal and the output terminal being respectively and electrically connected to a discharging terminal of the electrical cell and the first voltage regulation terminal of the boost/buck unit, the control terminal being electrically connected to a third control pin of the logic control unit;

a control switch, which has an end electrically connected to the discharging terminal of the electrical cell and an opposite end electrically connected to the control terminal of the first reverse current suppressor and the third control pin of the logic control unit;

a second reverse current suppressor, which comprises an input terminal, an output terminal, and a control terminal, the output terminal and the input terminal being respectively and electrically connected to the power receiving terminal of the circuit device and the first voltage regulation terminal of the boost/buck unit, the control terminal being electrically connected to a fifth control pin of the logic control unit; and a receipt or transmission mode selection unit, which is electrically connected between a receipt or transmission mode detection pin of the logic control unit and the discharging terminal of the electrical cell, the receipt or transmission mode detection pin being electrically connected to the automatic mode selection resetting module;

wherein the automatic mode selection resetting module determines to resume the originally set receipt mode or the originally set transmission mode according to a predetermined period.

2. The bidirectional wireless charging/discharging device as claimed in claim 1, wherein the receipt or transmission mode selection unit comprises one of a receipt or transmission mode selection switch and a receipt or transmission mode selection signal.

3. The bidirectional wireless charging/discharging device as claimed in claim 1, wherein the circuit device comprises a protection circuit, the protection circuit being electrically connected between the electrical cell and the power receiving terminal.

4. The bidirectional wireless charging/discharging device as claimed in claim 1, wherein the boost/buck unit comprises synchronous rectification that is MOSFET based synchronous rectification.

5. The bidirectional wireless charging/discharging device as claimed in claim 4, wherein the boost/buck unit that comprises synchronous rectification comprise an inductor and two MOSFETs serially connected in the same direction, the two MOSFETs each comprising a control terminal, the two the control terminals being respectively and electrically connected to the two control terminals of the boost/buck unit, the two serially-connected MOSFETs having a terminal electrically connected to the second voltage regulation terminal and an opposite terminal grounded, he inductor having a terminal electrically connected to the first voltage regulation terminal and an opposite terminal electrically connected between the two MOSFETs.

6. The bidirectional wireless charging/discharging device as claimed in claim 1 further comprising a third reverse current suppressor, which comprises an input terminal, an output terminal, and a control terminal, the output terminal and the input terminal of the third reverse current suppressor being respectively and electrically connected to the power receiving terminal of the circuit device and the output terminal of the second reverse current suppressor, the control terminal of the third reverse current suppressor being electrically connected to a sixth control pin of the logic control unit.

7. The bidirectional wireless charging/discharging device as claimed in claim 6, wherein each of the reverse current suppressors comprises a first resistor and two MOSFETs that are serially connected in opposite directions, the two serially-connected MOSFETs having two terminal serving as the input terminal and the output terminal of the reverse current suppressor, the two MOSFETs each having a control terminal, the two control terminals being electrically connected to the control terminal of the reverse current suppressor, the first resistor having an end electrically connected between the two MOSFETs and an opposite end electrically connected to the control terminal of the reverse current suppressor.

8. The bidirectional wireless charging/discharging device as claimed in claim 7, wherein each of the reverse current suppressors further comprises a transistor and a second resistor, the transistor having a first terminal electrically connected to the control terminals of the two MOSFETs and a second terminal grounded, the second resistor being electrically connected between a third terminal of the transistor and the control terminal of the reverser current suppressor.

9. The bidirectional wireless charging/discharging device as claimed in claim 1, wherein the logic control unit has a fourth control pin is electrically connected in a circuit form to the third control pin.

10. The bidirectional wireless charging/discharging device as claimed in claim 1, wherein the control switch comprises an automatic return switch.

11. The bidirectional wireless charging/discharging device as claimed in claim 1, wherein the receipt or transmission mode selection switch comprises a diode and a third resistor electrically connected thereto at an upstream side and the receipt or transmission mode selection switch comprises a fourth resistor electrically connected thereto at a downstream side.

12. The bidirectional wireless charging/discharging device as claimed in claim 1, wherein the logic control unit comprise an electrical cell voltage detection pin, which is electrically connected to the discharging terminal of the electrical cell to read voltage of the electrical cell.

13. The bidirectional wireless charging/discharging device as claimed in claim 1, wherein the logic control unit comprises a temperature detection pin, which is electrically connected to a temperature sensor to detect temperature of the bidirectional wireless charging/discharging device.

14. The bidirectional wireless charging/discharging device as claimed in claim 13, wherein the temperature sensor comprises a thermistor.

15. The bidirectional wireless charging/discharging device as claimed in claim 14, wherein the thermistor is connected in parallel to an end of a fifth resistor, the fifth resistor an opposite end electrically connected between the power pin of the logic control unit and the second voltage regulation terminal of the boost/buck unit.

\* \* \* \* \*